C. E. AKELEY.
COMPOSITE REFLECTOR AND METHOD OF MAKING THE SAME.
APPLICATION FILED MAR. 19, 1919.
1,382,261.
Patented June 21, 1921.
2 SHEETS—SHEET 1.
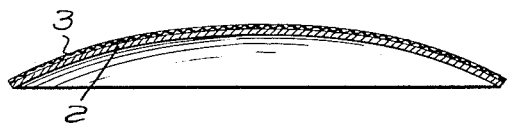
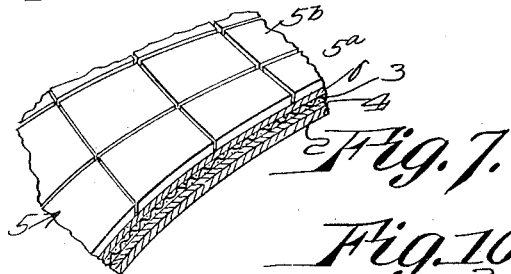
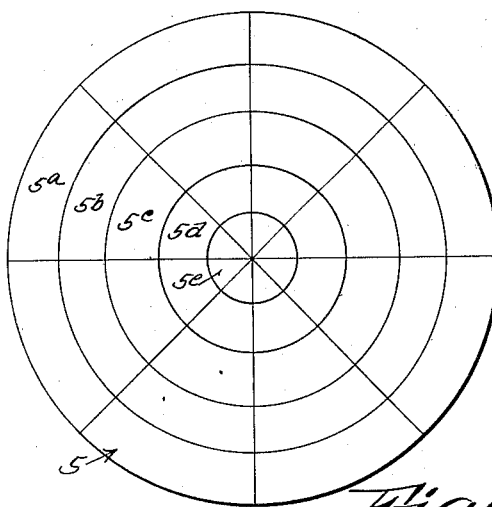
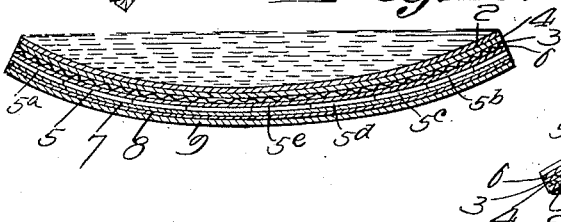
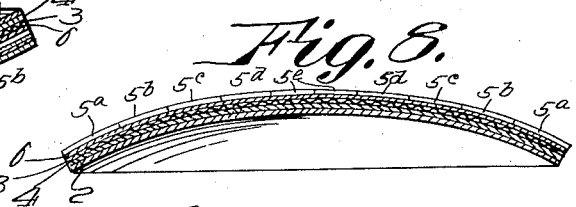
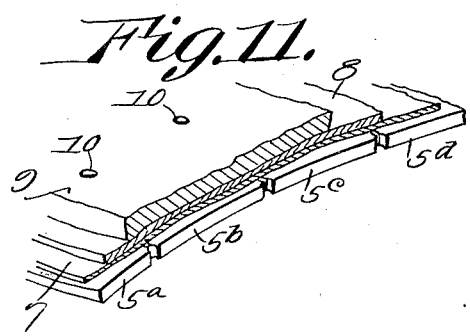
Inventor
Carl E. Akeley

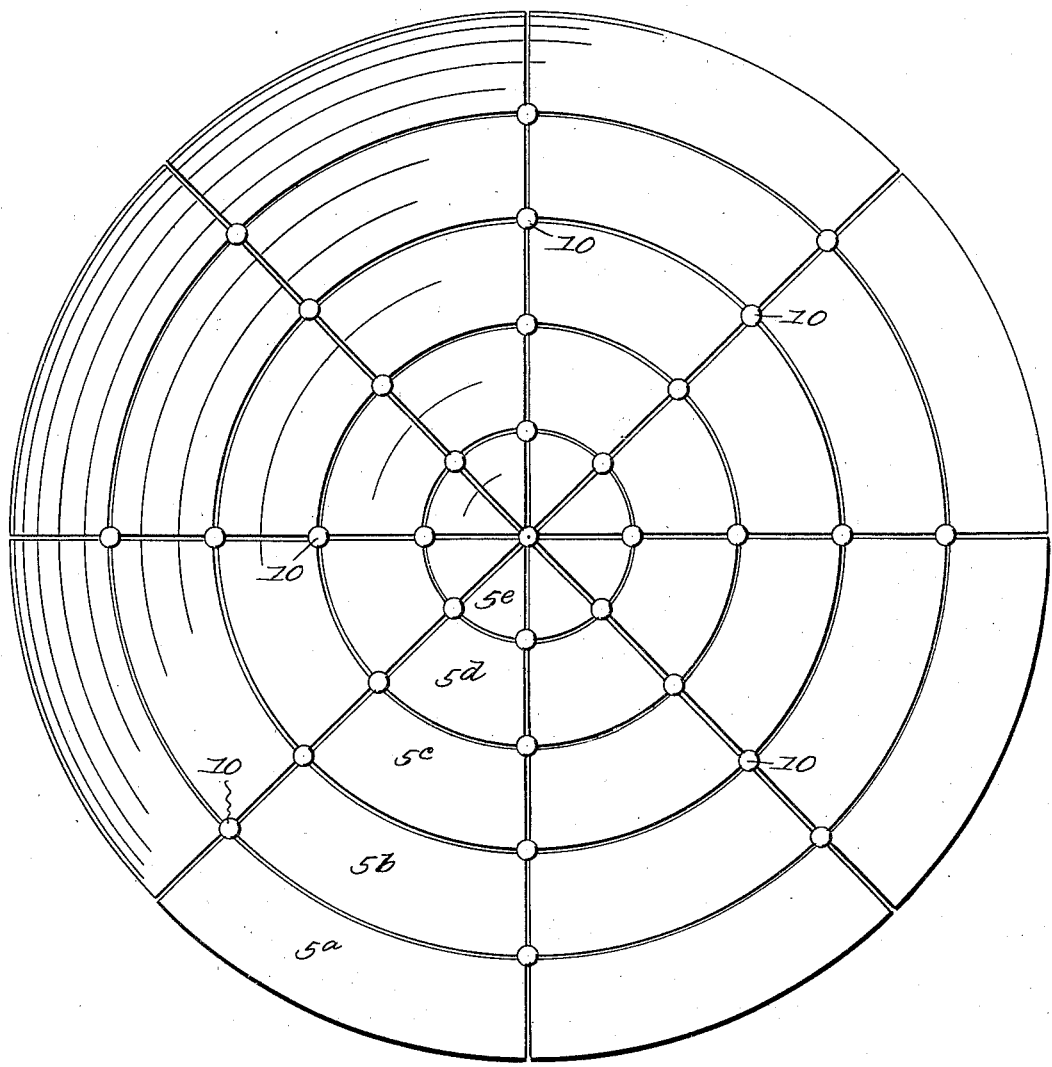

UNITED STATES PATENT OFFICE.

CARL E. AKELEY, OF NEW YORK, N. Y.

COMPOSITE REFLECTOR AND METHOD OF MAKING THE SAME.

1,382,261.  Specification of Letters Patent.  Patented June 21, 1921.

Application filed March 19, 1919. Serial No. 283,648.

(FILED UNDER THE ACT OF MARCH 3, 1883, 22 STAT. L., 625.)

*To all whom it may concern:*

Be it known that I, CARL E. AKELEY, a citizen of the United States, and a resident of New York city, in the county of New York and State of New York, have invented an Improvement in Composite Reflectors and Methods of Making the Same, of which the following is a specification.

The invention described herein may be used by the Government, or any of its officers or employees in prosecution of work for the Government, or by any other person in the United States without payment of any royalty thereon.

My invention relates to reflectors or mirrors and has for its object to provide a novel form of composite mirror that is practically indestructible and embodies the advantageous features of both glass and metal mirrors.

A further object of my invention is to provide a novel method of making composite mirrors by means of which curved mirrors of large size may be manufactured with a considerable reduction in cost as compared with glass mirrors of the same size.

Glass mirrors, as heretofore constructed, have usually comprised a heavy plate glass blank, ground and polished to provide an optically perfect surface upon which the reflecting material is deposited. The layer of reflecting material is usually provided with some sort of protective coating in the form of metal or paint, but of course, the strength and rigidity of the mirror depends entirely upon the thickness of the glass blank. It has been found that a large proportion of the cost and labor involved in manufacturing glass mirrors is in the grinding and polishing of the glass blanks, and furthermore, that the internal stresses set up within the glass incidental to the grinding and polishing, sometimes cause the glass to crack. In addition, the external strains to which the glass is subjected during the handling of mirrors often causes the glass to be cracked, which results in the total loss of the mirror.

In order to reduce the weight and cost of mirrors, metal mirrors have been constructed which have usually comprised a layer of reflecting material, such as silver, upon which is deposited a layer of dissimilar material, such as copper, of sufficient thickness to give a certain amount of rigidity to the entire mirror. However, it has been found necessary to provide metal mirrors with some additional form of backing in order to render the mirror self-supporting and to allow it to be handled without distortion. When silver has been employed as the reflecting surface in metal mirrors, it has been found necessary to cover the surface with a transparent coating, such as lacquer, in order to prevent the oxidation of the silver. The use of such a protective coating of course reduces the efficiency of the mirror as a reflector of light, as compared with a glass mirror. The chief advantage to be gained, however, by the use of metal mirrors lies in the fact that they may be handled without fear of cracking, as is always liable to happen with glass mirrors, for it is obvious that strains great enough to crack the backing of a metal mirror, will not result in destruction of the reflecting surface, nor will the cracks destroy the usefulness of the mirror as a reflector.

By my invention, I propose to provide a novel form of mirror and method of making same by means of which a mirror is produced having the strength of a metal mirror and at the same time having the efficiency of a glass mirror. I further provide a mirror in which the reflecting surface is subdivided into a large number of easily replaceable sections, so that any damage to the reflecting surface of the mirror is localized and may be easily repaired.

In the accompanying drawings:

Figures 1 to 10 inclusive are views showing the various steps in making a mirror in accordance with my invention.

Figs. 11 and 12 are views in section and front elevation, respectively, showing a completed mirror.

Referring to the drawings, the first step in constructing a mirror in accordance with my invention consists in providing a suitable form 1, as shown in Fig. 1, having the shape and size of the mirror which it is desired to produce. A templet 2 is then made from the form, as shown in Fig. 2, the templet being preferably composed either of inherently porous material, such as plaster of Paris, or of material having a large number of artificial pores, such as perforated metal. A sheet of cloth fabric 3, or of any other fibrous material, is then secured to the convex surface of the templet 2 by means of a cement 4 that is preferably readily dissolvable in water, for a purpose to be hereinafter described. The exact nature of the material 3 covering the templet is not vital to the practice of my invention, except that the material be of such a nature that it may be made to readily conform to the surface of the templet.

A thin glass blank 5, which is shown in Fig. 5, is then made and is of substantially the same form and curvature as the original form 1, shown in Fig. 1. The glass blank 5 is then cut along radial and concentric lines, as shown in Fig. 6, thus dividing it into a number of concentric zones composed of separate pieces $5^a$, $5^b$, etc., of the same size and having substantially the same curvature. The individual pieces $5^a$, $5^b$, etc., of glass are then secured one by one to the covering 3 of the templet 2 by means of a suitable cement 6, that is preferably impervious to moisture, until the templet is completely covered, the pieces of glass then being separated by spaces of about $\frac{1}{16}$ of an inch. The convex surface of the glass is then ground and polished until it has the exact curvature of the mirror, which it is desired to produce.

The templet 2 with the pieces of glass secured thereto is then placed in a suitable solution and a layer 7 of reflecting metal, such as silver, is then deposited upon the polished surface of the glass by any one of the well known methods of deposition. If desirable, a second layer 8 of metal, such as copper, is then deposited upon the reflecting surface, in order to protect it. Cementitious material 9, that is preferably impervious to water, is then applied to the layer 8, so that it enters the spaces between the pieces $5^a$, $5^b$, etc., of glass. Sufficient cementitious material 9 is applied to form a backing having the desired rigidity and strength. A preferred form of reinforcement for the material 9 is shown in my co-pending patent application, Serial No. 283,647, filed March 19, 1919.

The templet 2, with the mirror and backing adhering thereto, is then filled with water and allowed to stand for several hours. The water seeps through the porous templet 2 and softens the dissolvable cement 4 which secures the fabric 3 thereto, so that the templet may then be removed. The fabric 3 is then removed from the concave surface of the glass by any suitable means, after which the surface of the glass may be ground and polished. A plurality of rivets 10 are then applied at the corners of the pieces of glass, the rivets 10 extending through the backing material 9 and being riveted over, as shown in Figs. 11 and 12.

The completed mirror then comprises a large number of thin silvered glass pieces that are supported and secured together by means of a backing having great strength and rigidity. It is obvious that the glass is only made thick enough, so that it may be readily cut and ground without breaking and that the only function of the glass is to provide a protective covering for the reflecting surface that will not reduce the efficiency of the mirror.

It is also apparent that if any one of the glass pieces is cracked, it may be readily removed and a new piece of glass, that has been previously silvered, substituted therefor and secured to the solid backing of the whole mirror by means of cementitious material and rivets. In using mirrors constructed in accordance with my invention, it is probable that a few pieces of silvered glass for each zone would take care of all ordinary breakages. For instance, if one extra glass blank were to be provided for each four or five mirrors to be manufactured, this glass could be cut up and silvered in the same manner as the other blanks, but the pieces would be removed from the templet before having any backing applied. The pieces of glass could then be kept in stock and used as required.

I claim as my invention:

1. The method of making a composite reflector which consists in first providing a porous templet, then building up a reflector comprising a plurality of segments on said templet, then applying a backing of cementitious material to said reflector and finally in removing said reflector and backing from said templet by the use of a liquid percolating through said templet.

2. The method of making a composite reflector which consists in first providing a porous templet, then building up a reflector comprising a plurality of segments on said templet, the said segments being secured to said templet by a dissolvable cement, then applying a backing of impervious cementitious material to said reflector, then allowing a liquid to percolate through said porous templet and finally in removing said reflector and backing from said templet.

3. The method of making a composite reflector which consists in, first providing a porous templet, then securing a layer of fabric to said templet by a dissolvable cement, then building up a blank, comprising a plurality of glass segments, on said fabric, then depositing a surface of reflecting material on said glass, then applying a backing to said reflecting surface, then allowing a liquid to percolate through said porous templet and finally in removing said reflector and backing from said templet.

4. The method of making a composite reflector which consists in first providing a porous templet, then building up a reflector comprising a plurality of segments on said templet, then applying a backing to said reflector and finally in removing said reflector and backing from said templet by the use of a liquid percolating through said templet.

CARL E. AKELEY.